July 14, 1936.     C. OPOLO     2,047,286
CENTRAL SPRING SUSPENSION FOR VEHICLES
Filed April 25, 1934     2 Sheets-Sheet 1
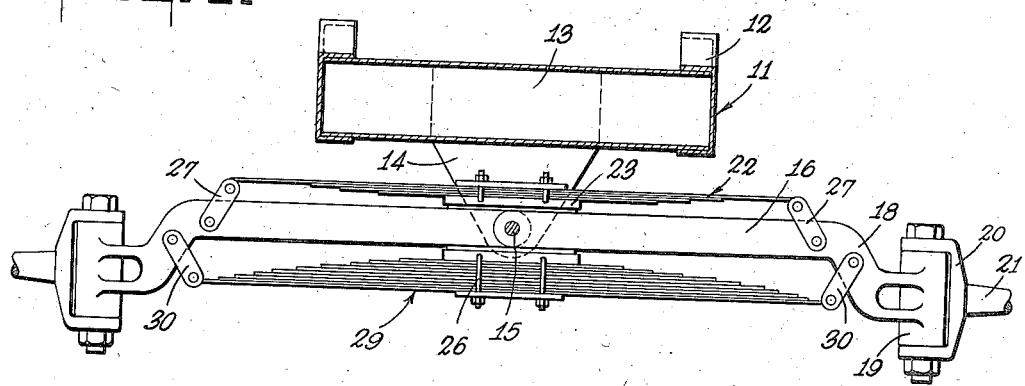
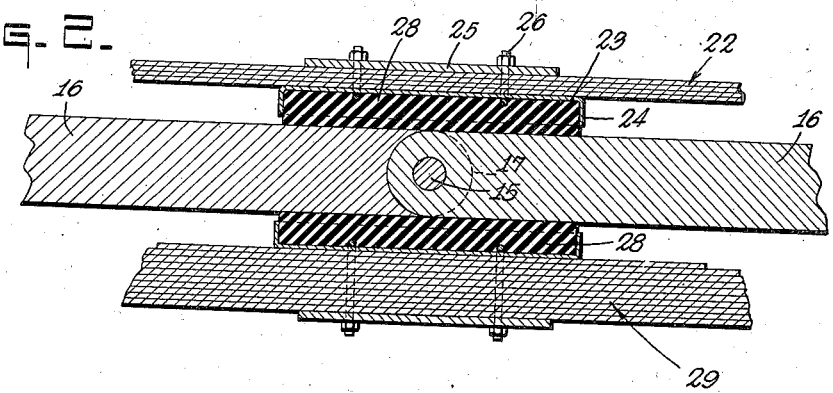
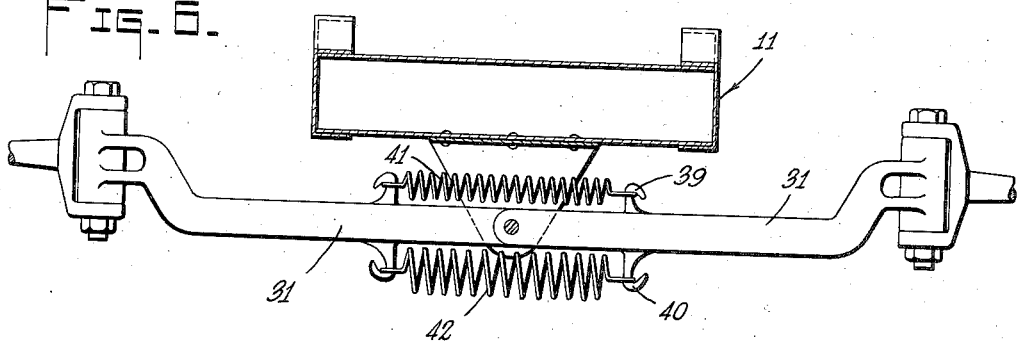
Inventor
C. Opolo
by Hazard and Miller
Attorneys.

July 14, 1936.  C. OPOLO  2,047,286
CENTRAL SPRING SUSPENSION FOR VEHICLES
Filed April 25, 1934  2 Sheets-Sheet 2

Inventor
C. Opolo
by Hazard and Miller
Attorneys.

Patented July 14, 1936

2,047,286

UNITED STATES PATENT OFFICE 2,047,286

CENTRAL SPRING SUSPENSION FOR VEHICLES

Charles Opolo, Culver City, Calif.

Application April 25, 1934, Serial No. 722,268

4 Claims. (Cl. 267—20)

My invention relates to a type of axle in which either wheel mounted on the axle may move up and down relative to the frame of the vehicle without materially affecting the opposite wheel.

An object and feature of my invention is in forming the axle in half axle sections which, in one form, may be pivoted together at their inner ends and also to the vehicle frame. In addition the two half axles are connected by springs which extend transversely of the vehicle and along the axle above and below the same. Thus, should either or both wheels at the end of the axle move up or down the springs will react to such movement being in effect brought into tension or compression.

Another object and feature of my invention in this form of having two half axles pivoted together and to a member depending transversely from the vehicle frame, is in using a leaf spring both above and below the axle assembly, each of these springs being secured at its outer end by means of a swivel shackle to the axle. The center portion of the leaf spring built up of a number of leaves is adapted to bear against the central portion of the axle above and below the longitudinal pivot.

In another form of the same type of axle I may use coil springs operating between spring seats or abutments on the half axle sections. These springs may either be of the compression or tension type, one being above and the other below the axle sections and extending across the longitudinal pivot of the axle members.

Another feature of my invention is forming the axle members with a split and the inner ends at the pivot being spread apart on such pivot to eliminate the use of radius rods connected between the vehicle frame and the axle sections.

Another object and feature of my invention is forming the flexible axle with a double lever section which is pivoted at its center by a longitudinal pivot through a bracket depending from the vehicle frame and to each end of this lever, part or half axle sections are secured. These axle sections are each swivelly connected to the vehicle frame by a swivel shackle and a spring is used connecting each of the axle sections above and below the pivot. In this case I preferably use coil springs which may either be of the compression or tension type. In some forms of my invention I may employ only one spring either positioned above or below the axle sections connecting opposite end portions thereof. This may be either a compression or tension spring.

With my type of spring mounting for the vehicle axle sections the amount of unsprung weight of a vehicle may be materially reduced, this being due to the fact that the springs have an effect of suspending the axle sections, to-wit: allowing these to respond to either bumps or depressions in the road.

My invention is illustrated in connection with the accompanying drawings, in which:

Fig. 1 is a vertical section through a part of a vehicle showing the axle sections and springs in elevation.

Fig. 2 is a partial enlarged view similar to Fig. 1 with the springs and axle sections shown in section.

Fig. 6 is a view similar to Fig. 3 illustrating a modification using tension springs.

Figure 3:
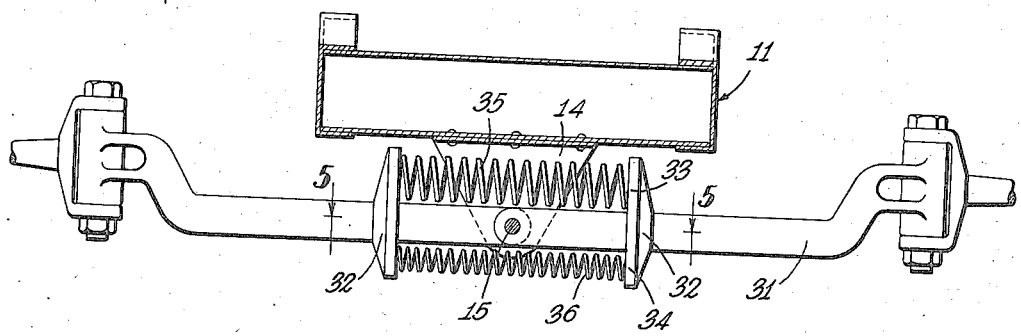
Fig. 3 is an elevation of a further modification of my invention, the vehicle frame being shown in section.

Referring to the construction of Figs. 1 and 2, the vehicle frame 11 is illustrated as having side rails 12 and a transverse beam 13. From this beam is a pair of depending brackets 14, these being tapered, and through these brackets there extends a pivot pintle 15, this being secured in any suitable manner. Two half axles 16 are pivoted on their inner portions 17 to the pivot pin 15. Each of these is illustrated as having a drop section 18 adjacent their outer ends and a hub 19 through which connects the yoke 20 and the swivelling axles 21, the latter carrying the vehicle wheels.

The spring mounting comprises an upper set of leaf springs 22. These have a metal plate 23 at the center portion, this having a downturned flange 24. A strap 25 is on the top of the stack of beams, the plate 23, the leaf springs and plate 25, and connected by a U-shaped clamp 26. The outer ends of the longest leaf are connected by shackles 27 to the outer portion of each axle section. A rubber pad 28 fits underneath the plate 23 being held in place by the downturned flange 24 and the axle sections on which the rubber pad bears.

The lower leaf spring assembly 29 is similar to the upper spring assembly as to the set-up and construction of the leaf springs and the use of a rubber pad. This spring assembly is connected by shackles 30 to the outer end of each axle section.

The springs are preferably initially tensioned so that they tend to arch in such a manner that the rubber pads are pressed snugly against the axle sections. Thus the weight of the vehicle tends to pivot the outer wheel ends of the axle sections upwardly. This is resisted mainly by the lower leaf spring assembly which is thus placed in a condition of tension, the pull of the shackles 30 tending to flatten this spring. When either or both wheels strike a bump in the road either one axle section 16 or both will pivot upwardly on their pivot 15 in relation to the vehicle frame. This will increase the tension or pull of the spring assembly 29, resisting its upward movement. When either one or both wheels drop into a depression in the road the upper leaf assembly is mainly brought into action and resists the downward movement of each half axle section. Thus the two spring assemblies tend to maintain the axle sections horizontally and in alignment. The spring pads press respectively on the upper and lower surfaces of the half axle sections. With this construction, if either or both springs are made so that they may carry compressive as well as tension stresses, only one spring assembly either above or below the axle may be used and will be satisfactory.

In the construction of Fig. 3 the vehicle frame and the bracket 14 and the pivot 15 are the same as in Figs. 1 and 2. In this case, the part axles 31 pivot at the single pivot 15. Each have a spring bracket 32 with upper and lower spring seats 33 and 34. In this case, a heavy compression spring 35 is illustrated as connected between the spring seats 33 above the axle and a light compression spring 36 between the compression springs 34 below the axle.

Figure 5:
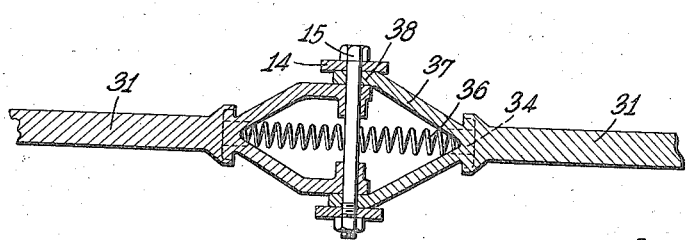
Fig. 5 is a longitudinal section on the line 5—5 of Fig. 3 in the direction of the arrows.

In order to give rigidity to the axle sections to avoid the use of radius rods the axle sections 31 have split inner ends indicated at 37, Fig. 5. These are spaced apart so that the hubs 38 of the split axle sections are spaced a considerable distance apart longitudinally of the pivot pin 15. In this case it is necessary to have the plates forming the bracket 14 spaced a considerable distance apart longitudinally of the vehicle frame.

With this type of construction the main pressure due to the upward reaction of the vehicle wheels in reference to the vehicle body is resisted by the upper compression spring 35 and this spring resists the upward movement of either wheel in reference to the vehicle frame due to one or both wheels striking a bump. The compression spring 36 resists the downward movement of the wheels due to depressions in the road relative to the vehicle frame. The reaction of the two springs maintains the axle sections normally in alignment. In this construction if desired, a single spring may be used either above or below the axle connected to its seat so that it may react both under compression and under tension.

In Fig. 6 I show a modification of the structure of Figs. 3 and 5 in that I employ, on the axle sections 31, upper and lower hooks 39 and 40 and secure upper and lower tension springs 41 and 42 between the respective upper pair and lower pair of hooks. In this case, the lower tension spring should be of greater strength than the upper spring in order that the lower spring may maintain the axle sections in alignment on a level road.

Figure 4:
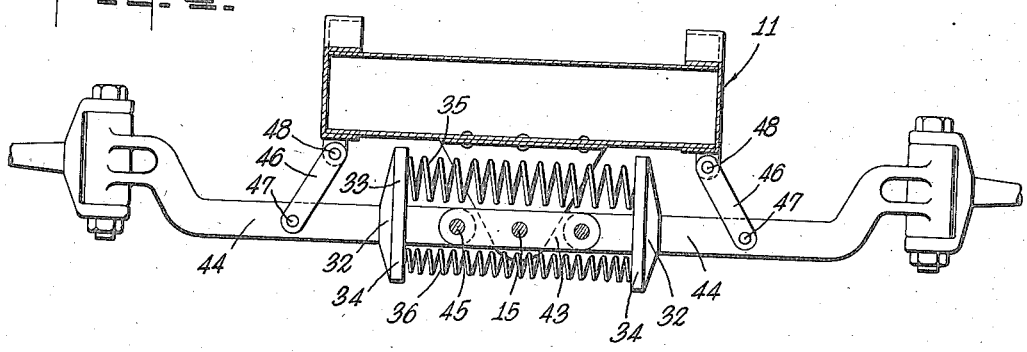
Fig. 4 is an elevation of a further modification with the vehicle frame shown in section illustrating a central double lever connecting two part axle sections and using compression springs.

In the construction of Fig. 4 the vehicle frame and the bracket 14 is the same as that illustrated, the single pivot 15 supports a double lever 43 which is pivoted at its center to a pivot 15. The outer axle sections 44 are pivoted at their inner ends by pivots 45 to the outer ends of the double lever 43. Shackles 46 are swivelled between swivel pins 47 on the outer axle sections 44 and swivel pins 48 attached to the outer edges of the vehicle frame. In this case I illustrate spring brackets 32 with spring seats 33 and springs 35 and 36 the same as is shown in Fig. 3. It will be understood, however, that in place of using the spring seats with compression springs I may use hooks as shown in Fig. 6 with tension springs.

In the operation of the construction of Fig. 4 the springs normally maintain the outer axle sections 44 and the double lever 43 in alignment. If one of the wheels strikes a bump its axle section will swing upwardly on its outer end causing a swivelling of the shackle 46 and tending to depress the end of the double lever 43 to which the moving axle section is connected. This movement is resisted by the springs and tends to communicate a reverse movement to the opposite axle section and the wheel attached thereto which is resisted by the smooth roadway and thus the single axle section may move up due to striking a bump, without affecting the other axle section. The movement, when one wheel drops into a depression is the reverse, but the relative reverse tilting of the opposite movable axle section is resisted by the tendency of the vehicle frame to maintain its original direction of movement. The springs thus increase the flexibility of the individual movement of the axle sections and limit the reaction of one axle section against the other.

When the vehicle is moving and both wheels strike a bump which tends to swing both axle sections upwardly, the double lever 43 tends to maintain its original position parallel to the transverse member of the vehicle frame and the axle sections swing on the pivots 45 and shackles 46. This movment is resisted mainly by the upper compression spring 36. When a reverse action takes place due to both wheels dropping into a depression, the lower compression spring 36 is brought into action, resisting the downward movement of the outer ends of the axle sections. Thus the springs take up the reactions between the axle sections with but little jolt communicated to the vehicle frame.

It is to be understood that I may use the type of axle shown in Fig. 4, that is, an axle employing a double lever pivoted at its center, with the type of leaf springs shown in Figs. 1 and 2 or with the tension spring shown in Fig. 6. Also, in this type the double lever may be of considerable width so that the pivots 45 to which are connected split ends of the axle 44 will function as radius rods.

From the above construction it will be apparent that either wheel on an axle section may move up and downwardly responsive to bumps and depressions in the road without materially affecting the operation of the other wheel should such wheel be running on a level section of the road. It is also apparent that a steering mechanism may be connected to the wheels for steering the vehicle, or if desired, the axle sections may have a wheel axle rigidly connected thereto and thus attaching the divided axle construction to a trailer, or the like, or any other axle which is non-rotatable.

Various changes may be made in the details of construction without departing from the spirit or scope of the invention as defined by the appended claims.

What I claim is:

1. In a device as described, a vehicle frame, a central bracket connected thereto, a pair of opposed axle sections, means pivoting said axle sections to the bracket, a swivel between each axle section and the vehicle frame, springs connecting each of the axle sections and disconnected from the vehicle frame and from the bracket.

2. In a device as described in claim 1, the means for connecting the axle sections to the bracket comprising a double lever pivoted on a longitudinal pivot to the bracket and each axle section being pivoted to an outer end of the double lever.

3. In a device as described in claim 1, the means for connecting the axle sections to the bracket comprising a double lever pivoted on a longitudinal pivot to the bracket and each axle section being pivoted to an outer end of the double lever, the springs being positioned above and below the double lever and its pivotal connection to the bracket.

4. In a device as described, a vehicle frame, a pair of opposed axle sections, a swivel shackle connecting each axle section to a side portion of the vehicle frame, the inner ends of each axle section being pivotally connected to the opposite ends of an inter-connecting link, each axle section having a spring seat and coil springs between said seats, one spring being above and the other below the link, said springs being disconnected from the link and from the frame.

CHARLES OPOLO.